United States Patent [19]

Kneller et al.

[11] Patent Number: 4,728,436

[45] Date of Patent: Mar. 1, 1988

[54] ANIONIC POLYMERS CONTAINING 3-ACRYLAMIDO-3-METHYLBUTANOIC ACID AS SCALE INHIBITORS FOR PREVENTING OR REDUCING CALCIUM PHOSPHATE AND OTHER SCALES

[75] Inventors: James F. Kneller, LaGrange Park; Donald A. Johnson, Naperville, both of Ill.

[73] Assignee: Nalco Chemical Company, Naperville, Ill.

[21] Appl. No.: 67,590

[22] Filed: Jun. 29, 1987

[51] Int. Cl.$^4$ ............................................. C02F 5/12
[52] U.S. Cl. ...................................... 210/701; 252/180
[58] Field of Search ...................... 210/701; 526/240; 252/180, 181

[56] References Cited

U.S. PATENT DOCUMENTS

| | | | |
|---|---|---|---|
| 3,752,760 | 8/1973 | Gordon et al. | 210/701 |
| 3,806,367 | 4/1974 | Lange et al. | 134/3 |
| 3,898,037 | 8/1975 | Lange et al. | 210/701 X |
| 3,928,196 | 12/1975 | Persinski et al. | 210/701 |
| 4,566,973 | 1/1986 | Masler, III et al. | 210/701 |
| 4,584,358 | 4/1980 | McCormick et al. | 526/240 |

*Primary Examiner*—Tom Wyse
*Attorney, Agent, or Firm*—John G. Premo; Anthony L. Cupoli; Donald G. Epple

[57] ABSTRACT

A method for preventing calcium phosphate and calcium carbonate scales in industrial cooling waters which comprises treating such waters with a few parts per million of a water-soluble acrylic acid copolymer which contains from 10–80 mole percent of 3-acrylamido-3-methyl butanoic acid, said polymer having a molecular weight within the range of 5–100,000.

2 Claims, No Drawings

ANIONIC POLYMERS CONTAINING 3-ACRYLAMIDO-3-METHYLBUTANOIC ACID AS SCALE INHIBITORS FOR PREVENTING OR REDUCING CALCIUM PHOSPHATE AND OTHER SCALES

INTRODUCTION

Certain boiler waters and many industrial waters such as those used in the operation of cooling towers are treated with a variety of inorganic and organic phosphorous-containing compounds. Such treatments tend to produce calcium phosphate scales which adhere to the metal surfaces of boilers and metallic heat exchangers.

Many of the known organic scale inhibitors and scale dispersants, both inorganic and those containing water-soluble polymers, while being effective against a wide variety of scales, are not entirely effective against calcium phosphate scales.

Pure calcium phosphate scales may exist as such but frequently are found as contaminants of calcium carbonate and calcium or magnesium salt scales. When such scales contain at least 10% of calcium phosphate, they are suitable for treatment with the scale inhibitors of the invention.

THE INVENTION

A method of inhibiting scale, particularly calcium phosphate scale and including calcium and magnesium carbonate scale and slightly soluble zinc compounds, which are formed on metal surfaces in contact with industrial cooling waters, evaporated sea water, oil well drilling waters, and boiler waters, which comprises treating the water present in such systems with a few ppm of a water-soluble anionic acrylic acid polymer which contains from 10-80 mole percent and preferably 20-50 mole percent of 3-acrylamido-3-methylbutanoic acid (AMBA). These polymers have a weight average molecular weight within the range of 5-100,000 with the preferred molecular weight being 10-20,000.

The anionic portion of the polymer is preferably acrylic acid, although the acrylic acid may be substituted in whole or in part by other anionic monomers such as methacrylic acid, maleic acid or its anhydride, fumaric acid and itaconic acid. Such terpolymers are included within the definition of "acrylic acid polymers".

The polymers may be employed either in their free acid form or in the form of their water-soluble salts such as sodium, potassium, ammonia or amine.

The polymers are used to treat the waters which contain scale-forming amounts of calcium phosphate and related scale-forming materials by treating such waters with a few parts per million of the active polymer. By a "few parts per million" is meant at least 3 parts per million with a typical dosage range being between 5-50 parts per million.

A typical method for preparing polymers of the type described above is set forth below:

EXAMPLE

Copolymer of Acrylic Acid (80 Mole %) and 3-Acrylamido-3-Methylbutanoic Acid (20 Mole %)

An aqueous solution of acrylic acid (28.2 g, 0.392 mole) and 3-acrylamido-3-methylbutanoic acid (16.8 g, 0.098 mole) was prepared by stirring the monomers together with 225 g of deionized water until complete solution occurred. The monomer solution was transferred to a reaction vessel and the solution was stirred and purged with nitrogen while heating it to 60° C. over 15 minutes. A solution of ammonium persulfate (2.25 g dissolved in 5.25 g of deionized water) was added all at once to the monomer solution followed immediately by a solution of sodium metabisulfite (6.75 g dissolved in 15.75 g of deionized water). Initiation occurred rapidly as the temperature of the reaction rose to 80° C. in one minute. After approximately sixteen minutes, the exotherm was complete and the temperature of the reaction had returned to 60° C. This temperature was maintained at 60° C. for 3.5 hours longer while continuing nitrogen purging. At the end of this time the reaction mixture was cooled to room temperature. The resulting polymer solution contained less than 1 ppm residual acrylic acid. Molecular weight (weight average) of the polymer was 13,700 as determined by GPC using polystyrene sulfonate standards in aqueous solution.

Advantages of the Invention

AMBA polymers have calcium phosphate scale inhibition activity better than a commercial sulfonated styrene-maleic acid polymer (Versa TL-4) and better than a commercial acrylic acid-2-hydroxypropyl acrylate polymer both of which are commonly used in cooling water as $Ca_3(PO_4)_2$ scale inhibitors (see Table I).

AMBA copolymers are hydrolytically stable in high pH applications and formulations because of the hindered secondary amide group in AMBA. Polymers containing ester functionality as in acrylic acid-2-hydroxypropyl acrylate copolymers, lose activity under high pH conditions as the ester groups hydrolyze.

AMBA copolymers have calcium carbonate scale inhibitor activity better than 1-hydroxy-ethylidenediphosphonic acid (HEDP) and better than low molecular weight commercial polyacrylic acids which are commonly used in industrial cooling water for $CaCO_3$ scale inhibition (see Table II).

Evaluation of the Invention

Following are laboratory test results showing several advantages of the invention.

TABLE I

Calcium Phosphate Inhibitor Tests[1] of Polymers Made with 3-Acrylamido-3-Methylbutanoic Acid (AMBA)

| Sample No. | Sample Composition | Mole Ratio (%) | $MW^2$ (GPC) | % Inhib. 10 ppm Dosage | Comments |
|---|---|---|---|---|---|
| 1 | Sulf. styrene -maleic acid | 75:25 | 18,950 | 85 | reference polymer |
| 2 | AA/HPA | 75:25 | 7,350 | 85 | reference polymer |
| 3 | AA/AMBA | 80:20 | 13,750 | 95 | |
| 4 | AA/AMBA | 50:50 | 11,500 | 89 | |
| 5 | AA/MAA/AMBA | 60:20:20 | 15,100 | 79 | |
| 6 | MAA/AMBA | 80:20 | 27,500 | 37 | |
| 7 | AM/AMBA | 50:50 | 8,860 | 2 | |
| 8 | Polyacrylic | 100 | 4,000 | 0 | reference |

TABLE I-continued

Calcium Phosphate Inhibitor Tests[1] of Polymers Made with 3-Acrylamido-3-Methylbutanoic Acid (AMBA)

| Sample No. | Sample Composition | Mole Ratio (%) | MW[2] (GPC) | % Inhib. 10 ppm Dosage | Comments |
|---|---|---|---|---|---|
| | acid | | | | polymer |

[1] All screening tests were done using water containing 250 ppm Ca (as CaCO3), 125 ppm Mg (as CaCO3), pH maintained at 8.5, no iron added. Tests are run for 4 hrs then filtered through a 0.45 um filter to remove Ca3(PO4)2 precipitate and the filtrate was analyzed for remaining phosphate.

[2] Molecular weights were determined by GPC and are based on polystyrene sulfonate standards in aqueous solution.

Abbreviations

AA — acrylic acid

MAA — methacrylic acid

AMBA — 3-acrylamido-3-methylbutanoic acid

AM — acrylamide

HPA — 2-hydroxypropyl acrylate

TABLE II

Calcium Carbonate Scale Inhibitor Tests of Polymers Made with 3-Acrylamido-3-Methylbutanoic Acid (AMBA)

| Sample No. | Sample Composition | Mole Ratio (%) | MW (GPC) | % Inhib. 10 ppm Dosage | Comments |
|---|---|---|---|---|---|
| 8 | Polyacrylic acid | 100 | 4,000 | 42 | reference polymer |
| 9 | HEDP | 100 | 206 | 48 | reference compound |
| 10 | AA/AMBA | 80:20 | 13,700 | 60 | |
| 4 | AA/AMBA | 50:50 | 11,500 | 9 | |
| 6 | MAA/AMBA | 80:20 | 27,500 | 18 | |
| 5 | AA/MAA/AMBA | 60:20:20 | 15,100 | 19 | |

Having thus described our invention, we claim:

1. A method for preventing calcium phosphate and calcium carbonate scales in industrial cooling waters which comprises treating such waters with a few parts per million of a water-soluble acrylic acid copolymer which contains from 10–80 mole percent of 3-acrylamido-3-methylbutanoic acid, said polymer having a molecular weight within the range of 5–100,000.

2. The method of claim 1 where the acrylic acid polymer contains from 20–50 mole percent of 3-acrylamido-3-methylbutanoic acid and has a molecular weight within the range of 10–20,000.

* * * * *